Patented July 5, 1938

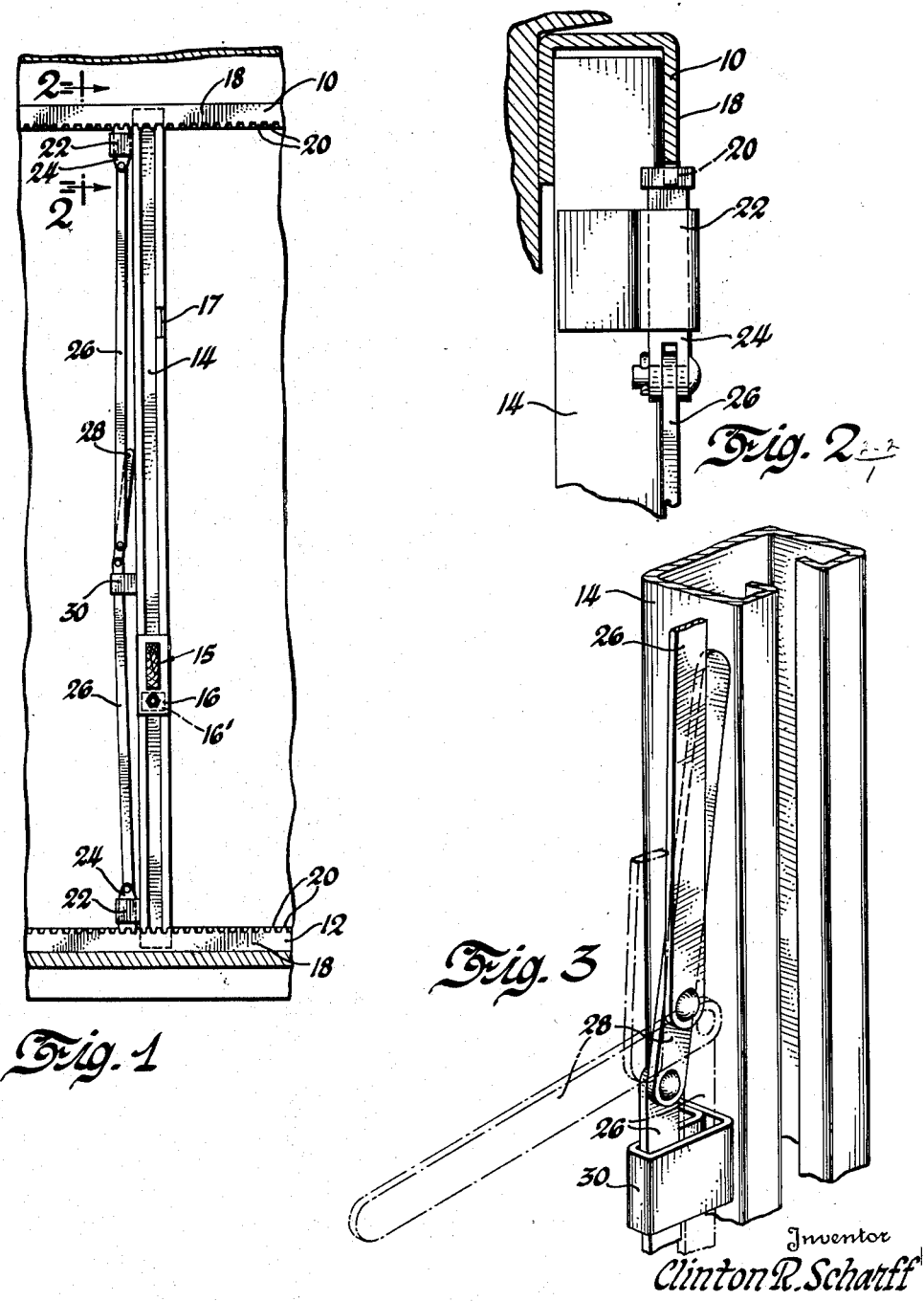

2,122,959

UNITED STATES PATENT OFFICE 2,122,959

FREIGHT CAR LOADING APPARATUS

Clinton R. Scharff, Detroit, Mich., assignor to General Motors Corporation, Detroit, Mich., a corporation of Delaware Application March 25, 1937, Serial No. 132,902

7 Claims. (Cl. 105—369)

This invention has to do with adjustable bracing means for holding freight in box cars against shifting during transit. The object is to provide an arrangement for mounting stanchions in box cars so that they are adjustable along the length of the side walls of the car, and may be positively locked in any desired position. The stanchions serve as supports for cross braces which engage the load and hold it in position. The construction described in this specification is simple, inexpensive and convenient.

In the drawing:

Figure 1 is a side view of a portion of the side wall of a box car showing my improved stanchion mounting.

Figure 2 is a fragmentary section on line 2—2 of Figure 1.

Figure 3 is a perspective view of the stanchion lock operating mechanism.

10 and 12 indicate oppositely facing channel-shaped members secured to the top and bottom of the side wall of the car and adapted to receive the ends of the stanchions 14 which are preferably also of channel section as shown in Figure 3. The stanchions are adapted to receive between them braces such as shown at 15 in Figure 1, the ends of the braces fitting in apertures in plates 16, adjustably clamped to the stanchions. Obviously, the braces may be shifted up or down in the stanchions, and clamped in position where desired. One flange of the stanchion is preferably cut away as at 17 to permit removal of the clamp 16' holding the plate 16 to the stanchion.

The outer flanges 18 of the channels 10 and 12 are shaped to provide gear teeth 20, and the stanchion carries adjacent its top and bottom, guides 22 in which reciprocate bolts 24 connected by links 26 to the toggle operating lever 28. Guide 30 is provided adjacent the toggle lever to hold the operating mechanism in position. It will be obvious that by moving the lever 28 from the position shown in Figure 1 to that shown in dotted lines in Figure 3 the bolts 24 will be withdrawn from locking engagement with the teeth 20, and the stanchion may then be slid along in the channels 10, 12 to the desired position of adjustment.

Obviously, the invention is capable of considerable modification. Thus the channels 18 may be replaced by other suitably shaped guides, as for instance, members of Z section or the like.

In equipping a freight car, it is but necessary to secure the guide members to the top and bottom of the side walls of the car, or if preferred to the top and bottom walls of the car. It will be noted that the guides are substantially free of projections that might interfere with loading or unloading. The stanchions are self-contained units carrying their locking mechanism with them, and as many may be used in a car as are required to hold the load in position. The positive locking mechanism insures that the shifting force of the load will not displace the stanchions.

The invention is, of course, applicable to other forms of carriers than freight cars. Where in the claims reference is made to "top," "bottom" and so on, it is understood that the terms are used in a relative sense only.

I claim:

1. Load bracing means for freight cars comprising channel shaped guides secured adjacent the top and bottom of the sides of the car, the guides on the same side of the car being arranged with their channels facing each other, a stanchion having its ends sliding in said channels, said guides having teeth formed on corresponding oppositely facing flanges, and locking means carried by the stanchion and adapted to engage said teeth to lock the stanchion in position, said teeth and locking means having their engaging portions extending longitudinally of the stanchion so as to prevent displacement of the stanchion longitudinally of the car.

2. Load bracing means for freight cars comprising channel shaped guides secured adjacent the top and bottom of the sides of the car, the guides on the same side of the car being arranged with their channels facing each other, a stanchion having its ends sliding in said channels, said guides having teeth formed on corresponding oppositely facing flanges, reciprocating bolts carried at opposite ends of the stanchion and adapted to engage said teeth, said teeth and bolts having their engaging portions extending longitudinally of the stanchion to prevent displacement of the stanchion longitudinally of the car and means for holding the bolts in locking position.

3. Load bracing means for freight cars comprising channel shaped guides secured adjacent the top and bottom of the sides of the car, the guides on the same side of the car being arranged with their channels facing each other, a stanchion having its ends sliding in said channels, said guides having teeth formed on corresponding oppositely facing flanges, reciprocating bolts carried at opposite ends of the stanchion and adapted to engage said teeth, said teeth and bolts having their engaging portions extending longitudinally of the stanchion to prevent displacement of the stanchion longitudinally of the car and common operating means for said bolts.

4. Load bracing means for freight cars comprising channel shaped guides secured adjacent the top and bottom of the sides of the car, the guides on the same side of the car being arranged with their channels facing each other, a stanchion having its ends sliding in said channels, said guides having teeth formed on corresponding oppositely facing flanges, reciprocating bolts carried at opposite ends of the stanchion and adapted to engage said teeth, said teeth and bolts having their engaging portions extending longitudinally of the stanchion to prevent displacement of the stanchion longitudinally of the car, links pivoted to said bolts, and a toggle lever pivoted to said links for holding the bolts in locked position.

5. Load bracing means for freight cars comprising channel-shaped guides secured adjacent the top and bottom of opposite walls of the car, the guides on the same wall being arranged with their channels facing each other, stanchions having their ends slidably mounted in the channels of opposed guides, said guides having teeth formed on corresponding oppositely facing flanges, cooperating teeth carried by said stanchions, means for engaging the teeth on the stanchions with the teeth on the guides to lock the stanchions in position, both of said sets of cooperating teeth having their engaging portions extending longitudinally of the stanchion to prevent displacement of the stanchion longitudinally of the car and bracing means connecting oppositely disposed stanchions.

6. In the combination as defined in claim 5, said stanchions being of channel shape with the channels facing inwardly, and said bracing means having its ends received in said channels.

7. In the combination as defined in claim 5, said stanchions being of channel shape with the channels facing inwardly, and said bracing means including brace supports mounted for adjustment longitudinally of said stanchions, and braces extending between said supports and having their ends housed in the channels of the stanchions.

CLINTON R. SCHARFF.